United States Patent
Drijver et al.

[11] Patent Number: 5,860,680
[45] Date of Patent: Jan. 19, 1999

[54] SEALING SYSTEM—ANTI COLLAPSE DEVICE

[75] Inventors: Frans Pieter Drijver, Eze Sur Mer; Rene Perratone, Menton, both of France

[73] Assignee: Single Buoy Moorings Inc., Marly, Switzerland

[21] Appl. No.: 939,608

[22] Filed: Sep. 30, 1997

Related U.S. Application Data

[62] Division of Ser. No. 552,311, Nov. 8, 1995, Pat. No. 5,720,503.

[51] Int. Cl.$^6$ .................................................... F16L 17/035
[52] U.S. Cl. ................................ 285/95; 285/98; 285/111; 285/281; 277/564
[58] Field of Search .................................. 277/553, 555, 277/564, 366, 395, 545, 647; 285/111, 95, 281, 98

[56] References Cited

U.S. PATENT DOCUMENTS

| | | |
|---|---|---|
| 1,297,370 | 3/1919 | Loomis . |
| 1,757,724 | 5/1930 | Larson . |
| 1,795,541 | 3/1931 | Brownell . |
| 2,384,360 | 9/1945 | Allen et al. . |
| 2,701,155 | 2/1955 | Estel ........................................ 277/555 |
| 3,114,561 | 12/1963 | Creath et al. ............................ 277/555 |
| 3,884,511 | 5/1975 | Hermanson . |
| 4,133,542 | 1/1979 | Janian ..................................... 277/555 |
| 4,585,238 | 4/1986 | Nicholson ............................... 277/555 |
| 4,626,003 | 12/1986 | Williams et al. . |
| 5,265,890 | 11/1993 | Balsells .............................. 277/553 X |
| 5,411,298 | 5/1995 | Pollack . |

FOREIGN PATENT DOCUMENTS

| | | |
|---|---|---|
| 957 704 | 2/1957 | Germany . |
| 321563 | 10/1934 | Italy . |
| 762196 | 11/1956 | United Kingdom . |
| 2 029 917 | 3/1980 | United Kingdom . |

*Primary Examiner*—Dave W. Arola
*Attorney, Agent, or Firm*—Young & Thompson

[57] ABSTRACT

A sealing system for a rotatable fluid conduit coupling or swivel, in particular a swivel for the off-shore oil and gas exploitation or the like, the coupling comprising an inner or first part, an outer or second part concentrically surrounding the first part, an annular chamber formed by the opposite outer and/or inner walls of the inner and outer parts respectively, the chamber being connected to a fluid conduit in the first part and a fluid conduit in the second part, and a clearance between the parts on either side of the chamber which clearances each are sealed by at least one sealing ring located in an annular recess in one and/or the other of the opposite walls forming the clearance, the sealing ring being of resilient low friction material and of the type which allows flexing of the seal lips under over pressure in the clearance from the side of the chamber beyond the pressure behind the sealing ring, the improvement being that in the recess the sealing ring cooperates with or has been provided with means which limit the degree of flexible deformation in case reverse pressure occurs over the sealing ring.

4 Claims, 4 Drawing Sheets

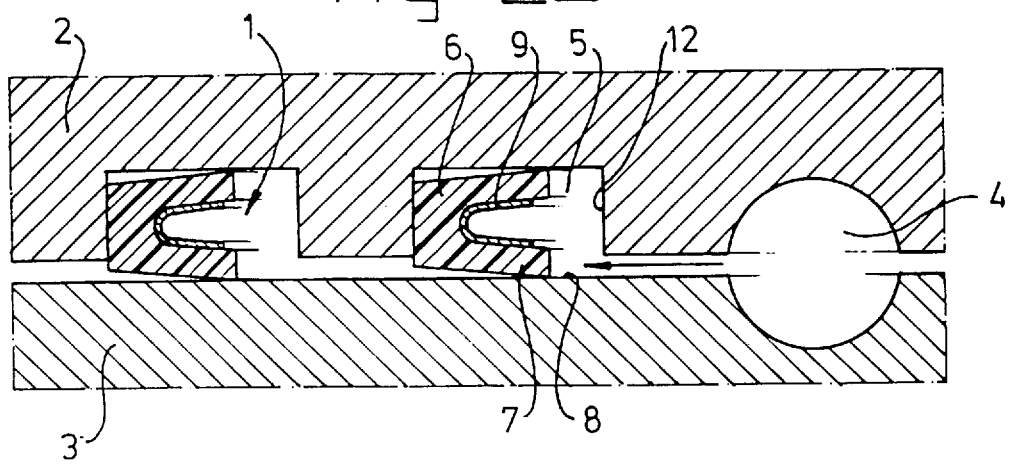
Fig-2a Prior art
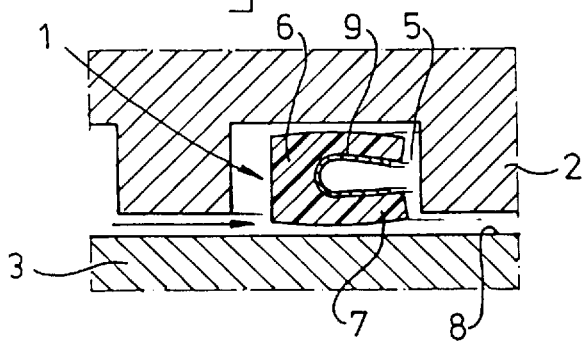
Fig-2b Prior art
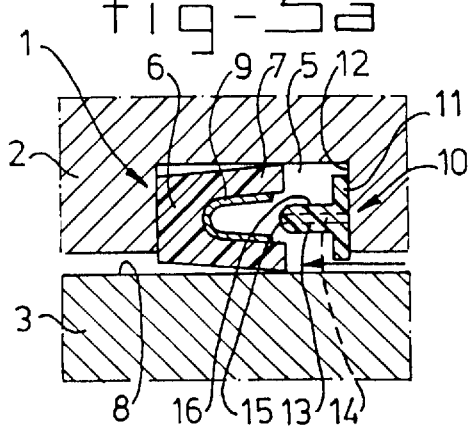 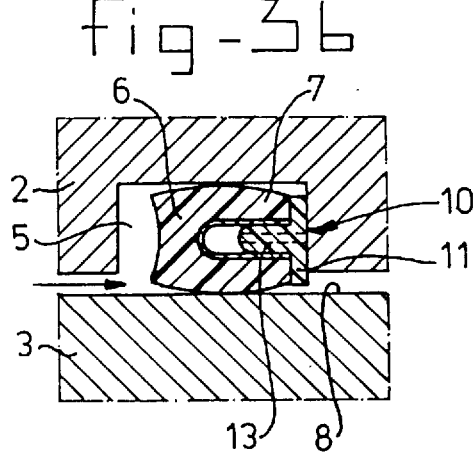
Fig-3a  Fig-3b

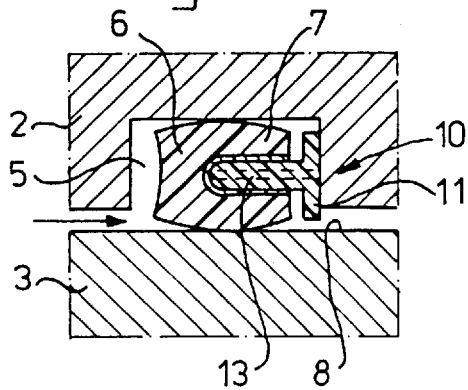
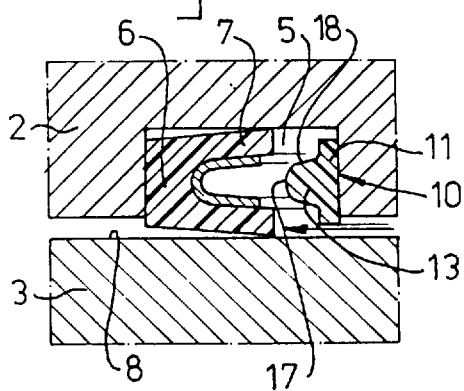
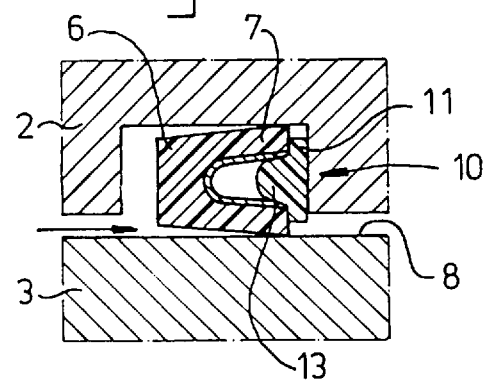
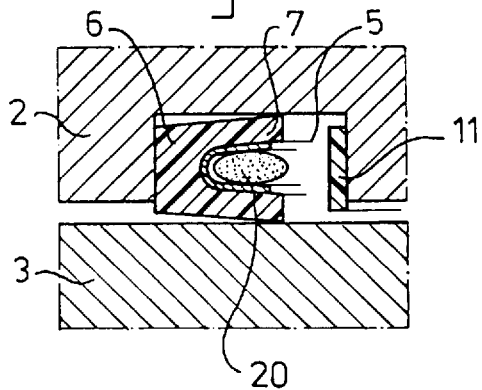
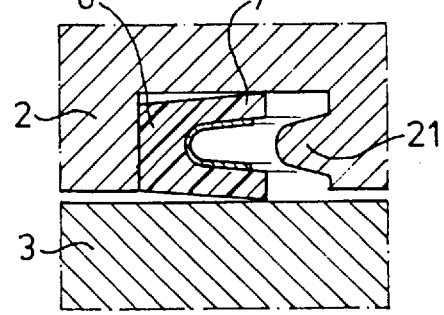

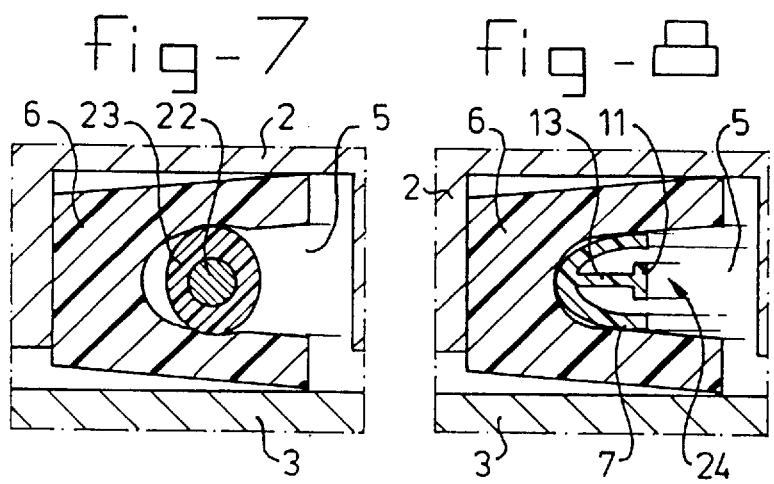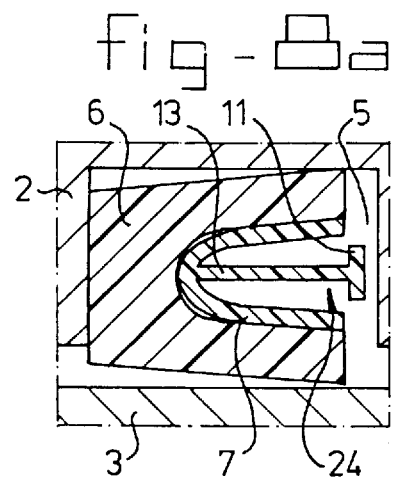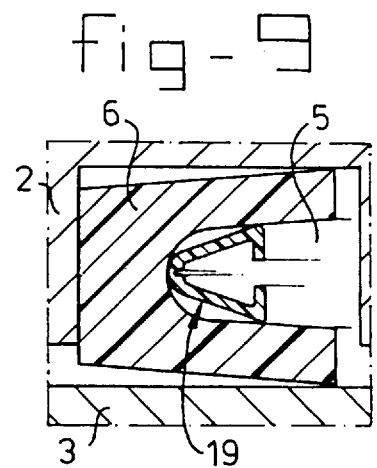

SEALING SYSTEM—ANTI COLLAPSE DEVICE

This application is a division of application Ser. No. 08/552,311, filed Nov. 8, 1995 now U.S. Pat. No. 5,720,503.

The invention relates to a sealing system for a rotatable fluid conduit coupling or swivel, in particular a swivel for the off-shore oil and gas exploitation or the like.

Sealing systems of this kind are well known for instance from U.S. Pat. No. 4,635,971 concerning a rotatable pipe coupling for a plurality of incoming and a plurality of outcoming pipes.

Sealing systems of the above mentioned known type are well known for the transfer of liquid and gases between for instance a bottom well under water through hoses or risers towards a turret at for instance the bow of an anchored vessel which has to weathervane around its location which requires that in the fluid connection between the well and the vessel a rotatable coupling for the fluid connection or connections is present which coupling usually is called a swivel.

BACKGROUND OF THE INVENTION

The well known swivels have large dimensions and the fluids which have to pass may have high pressures and sometimes high temperatures. Failure of the sealing systems must be avoided because leakage means pollution and repair means interruption of the transfer of fluids, which effects make repair of the sealing system extremely expensive.

It is therefore common practice to provide the swivel on either side of the chamber between the mutually rotatable parts with a plurality of sealing rings. In many cases, these sealing rings are of the type which is U-shaped or V-shaped in cross section and has flexible legs accordingly, one of which legs engages the surface of one part of the swivel and the other engages the opposite face of a recess provided in the other part of the swivel. In case seal materials are applied which do not provide the required stiffness for sealing, spring energisers may be provided. The sealing rings are turned towards the chamber so that fluid leaking through the clearance between the two parts presses the parts or legs of the sealing ring apart and in contact with the surfaces, upon which sealing has to take place.

Sealing rings of this type seal only in one direction. Consequently, if there is a reverse pressure, the sealing may collapse.

If only a single sealing ring is provided on either side of the chamber, leakage may still occur which is the reason why swivels normally have a second sealing ring spaced apart from the first one so that any leakage passing the first sealing ring is dealt with by a second sealing ring.

Leakage has as the consequence that after some time the pressure in the clearance between the two sealing rings becomes substantially equal to the pressure in the chamber to which the main conduits of the fluid transfer system are connected.

The fluid passing the swivel may be a liquid such as oil, a gas, or a mixture of gas and liquid.

A pressure-drop at the fluid chamber side has the consequence that liquid which did leak beyond the first sealing ring and eventually is present between the two sealing rings, is pressurised by swivel contraction and thus forced to flow in the opposite direction, thereby passing the first sealing ring which may result in a collapse of the first sealing ring. The collapse can take place under varying pressure conditions which may result in permanent deformation of the sealing ring and this has the consequence that, as soon as the pressure conditions are returned to normal, the sealing ring no longer seals properly.

For sealing of gas swivels and/or for ensuring lubrication of the pressure carrying seal member, an additional seal may be provided closest to the fluid with its sealing lips toward the pressure carrying seal so that an over pressurised lubricating barrier liquid can be injected in between. A pressure drop in the barrier liquid due to a seal or hydraulic system failure will also result in a reverse pressure on the seal and collapse of the seal consequently.

SUMMARY OF THE INVENTION

Object of the invention is to provide a sealing system in which collapse of the seal no longer can take place and accordingly the reliability of the sealing system is improved.

According to the invention this object is achieved by a sealing system for a rotatable fluid conduit coupling or swivel, in particular a swivel for the off-shore oil and gas exploitation or the like, the coupling comprising an inner or first part, an outer or second part rotatably connected to the first part, a chamber defined between the parts, the chamber being connected to a fluid conduit in the first part and a fluid conduit in the second part, and a clearance between the parts which is sealed by at least one sealing ring located in an annular recess in one and/or the other of the opposite walls forming the clearance, the sealing ring being of resilient material and of the type which functions under a positive pressure difference in the clearance, the improvement being that in the recess the sealing ring cooperates with or has been provided with means which limit the degree of deformation in case a negative pressure difference occurs.

The inventive measure has the effect, apart from not changing the normal function of the sealing, to prevent unacceptable plastic deformation and accordingly prevents collapse of the sealing ring. A reverse pressure, which gradually, suddenly or repeatedly occurs, may cause the fluid to flow in the opposite direction but cannot deform the sealing ring nor its spring energiser permanently to a degree such that it looses its capacity to seal properly.

In a sealing system wherein as usual the sealing ring is of the symmetric or asymmetric U-shaped or V-shaped type in cross section comprising a body part and spaced apart flexible legs, the means for limiting the degree of flexure or deformation are formed by an annular profile inside the recess which controls seal and spring deformation under reverse pressure over the sealing ring and the legs of its spring energiser. The annular profile keeps the legs of the sealing ring spaced apart close to the normal position in which the legs keep sealing without unacceptable deformation. Accordingly an anti-collapse device is obtained. Many embodiments are possible to obtain the supporting function. For example the profile may form an integral part of the wall of the recess.

Preferably the profile forms part of a separate annular element placed in said recess opposite the space between the legs of the sealing ring and having a base part which inside the recess finds support upon the walls of the recess. The annular element may have a passage to prevent an undesired pressure difference on opposite sides of said element.

The faces of the profile which support the legs of the sealing ring may be parallel to each other and to the axis of the coupling or may be at an angle with respect to each other. The length of the profile may be equal, longer or shorter than the length of the legs of the sealing ring. The passage or through going bore also prevents deformation of the annular element or tilting of the element due to pressure differences.

The profile may be designed to allow for limited elastic deformation of the sealing legs to allow a reverse flow of fluids, but may also be designed to provide an increasing load on the sealing legs with increasing reverse pressure to ensure sealing of the fluids in the normal and reverse direction.

The principle of the invention may also be applied with U-shaped or V-shaped sealing rings or spring energisers which are provided with integral elements which prevent collapse. One possibility is to provide the sealing ring with an integral central rib which between the outer ends of the legs have been provided with transverse extensions extending towards and between the outer ends.

As an alternative the legs of the sealing ring may have integral parts which in a transverse plane extend towards each other with the ends spaced apart.

In both cases the flexible legs of the sealing ring or spring are prevented from flexing too far inwardly.

Instead of a ridge it also is possible to place between the legs of the sealing ring an annulus which fits between the inner faces of the legs and preferably extends beyond the ends of the legs so that in case of reverse pressure from the wrong side, which tries to collapse the sealing ring the legs find support or are even pressed apart by the annulus. The annalus may be of rigid or resilient material.

The principle of the present invention may also be applied in case the sealing ring is of the type with a circular or oval cross section in which case the means for preventing collapse are in the form of a core placed inside the hollow space of the ring.

In this case the sealing ring is prevented from undue movement in both directions.

BRIEF DESCRIPTION OF THE DRAWINGS

The invention will be further elucidated with reference to the embodiments shown the drawings, wherein:

FIG. 2a shows in cross-section a prior art sealing system applied in an off shore swivel;

FIG. 2b shows in cross-section a prior art sealing system collapsed due to reverse pressure;

FIG. 3a shows in cross-section a first preferred embodiment of the anti-collapse device according to the invention;

FIG. 3b shows in cross-section the sealing system of FIG. 3a prevented from collapsing due to the anti-collapse device according to the invention and sealing under reverse pressure;

FIG. 3c shows in cross-section the sealing of FIG. 3a prevented from collapsing due to the anti-collapse device according to the invention comprising an anti collapse device being longer than the seal ring legs;

FIG. 4a shows in cross-section a second embodiment of the anti-collapse device of the invention;

FIG. 4b shows in cross-section the sealing system of FIG. 4a prevented from collapsing due to the anti-collapse device according to the invention;

FIGS. 5 to 8 show in cross-section other embodiments of the anti-collapse device of the invention;

FIG. 9 shows in cross-section another embodiment of the anti-collapse device forming part of the sealing system or sealing spring energiser itself.

DETAILED DESCRIPTION OF THE INVENTION

Figure 1:
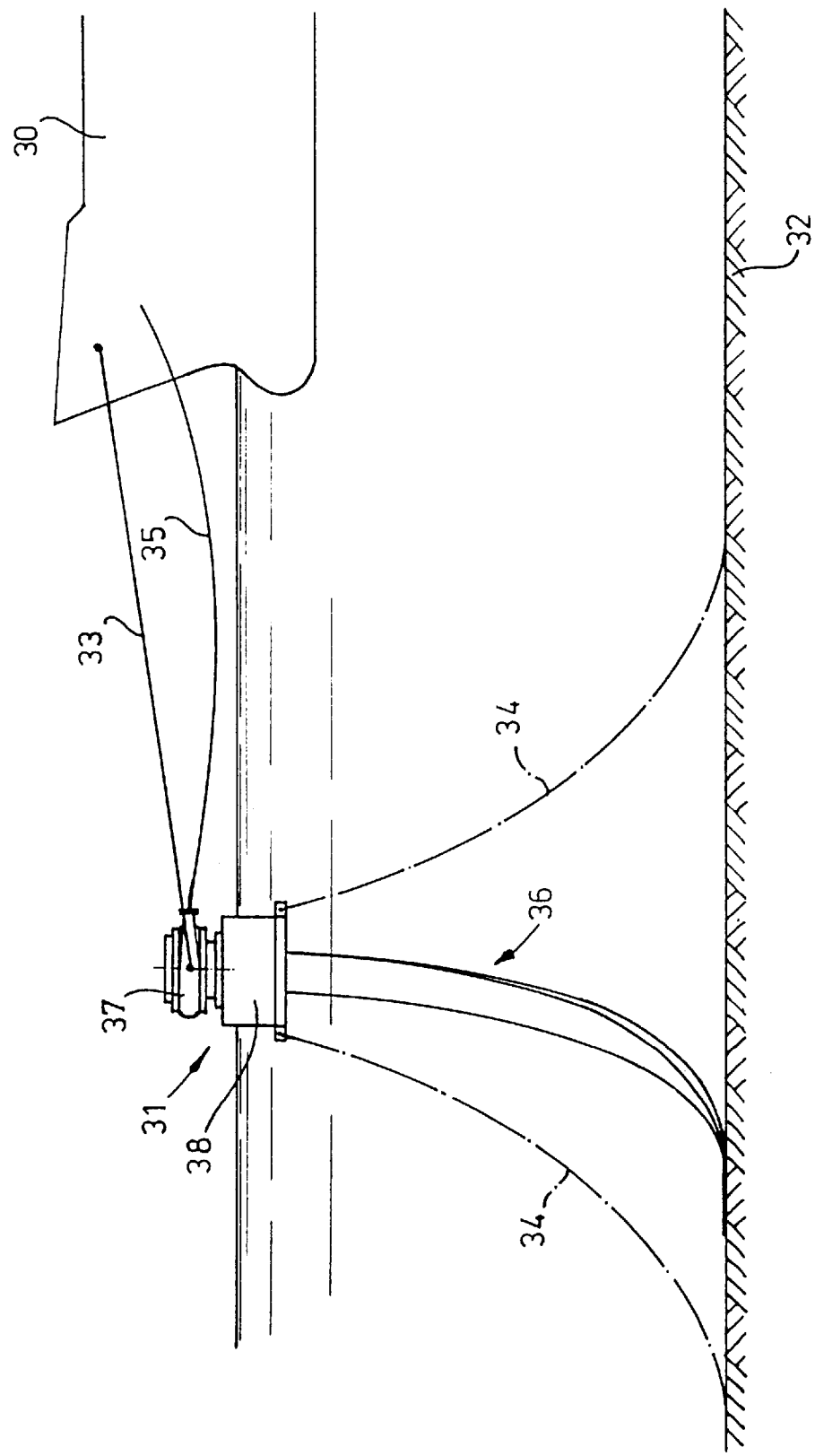
FIG. 1 shows a prior art swivel.

In FIG. 1 a complete figure of a swivel is shown. The swivel 31 is anchored to the sea bed 32 by anchoring lines 34. The vessel 30 may weathervane freely around the swivel 31. The vessel 30 is connected to the swivel 31 by connecting lines 33. Gas or oil or the like is tranported by pipe lines 36 and 35 from a well (not shown) via the swivel 31 to the vessel 30. The swivel 30 comprises a top part 37 which is rotable with respect to the lower part 38.

In FIG. 2a a prior art sealing system 1 is shown applied in e.g. an off shore swivel, comprising a ring shaped first part 2 and a ring shaped second part 3 cooperating with the first part 2, and forming an annular chamber 4 and at least one recess 5. The sealing system 1 is present in at least one recess 5 comprising a sealing ring body 6, at least one sealing lip 7 for contacting with a sealing surface 8 of one part 3 of the swivel and a spring 9. In case the pressure of the liquid, gas or gas-liquid mixture in the chamber 4 exceeds the pressure present in the clearance between the two parts 2 and 3 of the swivel behind one or both of the sealing system(s) 1, this pressure, in addition to the pressure of the spring 9 forces the seal lip 7 toward the sealing surface 8 therewith sealing the clearance between the two parts of the swivel. In this case the sealing ring 6, 7 abuts the side of the recess 5 opposite the surface 12 of the swivel part 2 with the sealing ring body 6.

In FIG. 2b the prior art sealing system 1 of FIG. 2a is shown collapsed due to reverse pressure. The latter pressure forces the sealing ring 6, 7 toward the chamber 4. Accordingly, the pressure in chamber 4 is no longer able to support the force of the sealing lip 7 towards the sealing surface 8 and the pressure behind the sealing ring forcing the sealing lip 7 inwards against the pressure of the spring 9. Dependant on the forces acting upon the sealing ring from either side concerning the direction of the forces acting upon the sealing system, the sealing ring body 6 and/or the sealing lip 7 and the spring 9 may deform permanently, causing severe leakages and thus require major repairs.

In FIG. 3a of the invention a first preferred embodiment of the anti-collapse device 10 is shown. The arrangement according to FIG. 3a corresponds to the arrangement according to FIG. 2a. The anti-collapse device 10 is provided in at least one recess 5 and comprises a ridge or plug part 13 for preventing collapse of the sealing ring 6, 7 and a base part 11, primarily suited for abutting the surface 12 of one part 2 of the off shore swivel. The base part 11 could be provided with a through hole 14 extending through the plug part 13. The through hole or bore 14 serves for pressure compensation and ensures that the part maintains its proper position. The plug part 13 of the anti-collapse device 10 has side faces 16 between its outer end 15 and the base part 11 which extend substantially parallel to the sealing surface 8. The base part 11 of the anti-collapse device 10 may be freely slidable with respect to the abutting surface 12 of the one part 2 of the off shore swivel.

In FIG. 3b the sealing system 1 according to the invention is shown in the position in which it prevents collapse of the sealing ring 6, 7 due to the presence and functioning of anti-collapse device according to FIG. 3a. The situation according to FIG. 3b corresponds to the situation according to FIG. 2b. In FIG. 3a the pressure present in the clearance between the two swivel parts 2, 3 behind the sealing system(s) 1, forces the sealing ring 1 toward the chamber 4 and the sealing lip 7 inward against the pressure of the spring 9, and in case the pressure behind the sealing ring is larger than the pressure from the side of the chamber 4, the sealing ring will move to the right in FIG. 3a, 3b and 3c with the result that the plug part 13 will enter between the legs 7 of the ring therewith preventing any further deformation of the legs towards each other whilst the pressure behind the body portion bulges the legs outwardly against the walls such as 8, upon which sealing has to take place. Due to the plug part 13 the deformation of the sealing ring body 6, the sealing lip 7 and the spring 9 will be kept in their elastic range thus extending the lifetime of the sealing system and reducing service and cost.

In FIG. 4a a second embodiment of the anti-collapse device 10 is shown. The main difference between this embodiment and the embodiment according to FIGS. 3a and 3b is, that now the ridge or plug part 13 has a surface 17 of which the abutting section 18 has tapering side faces. The plug part 13 of the anti-collapse device 10 is integral with the base part 11. The anti-collapse device 10 may be provided with a through going bore (not shown). The situation according to FIGS. 4a and 4b correspond to the situation according to FIGS. 3a and 3b.

FIG. 4b shows how the sealing ring 6, 7 is prevented from collapse due to the anti-collapse device of FIG. 4a. The plug part 13 may have any shape to sufficiently block the deformation of the sealing ring body 6, the seal lip 7 and the spring 9. In FIGS. 4a and 4b the plug part 13 has a somewhat semicircular cross-section at the top.

In FIG. 5 another embodiment of the anti-collapse device 10 is shown, wherein base part 11 and plug part 20 are separate parts. If the sealing moves towards the base part 11 the plug part will become compressed and will press the legs 7 away from each other, thus preventing the collapse. It will be evident that in that case the base plate 11 could be omitted.

The plug part 20 preferably is made from resilient material, like steel or plastic.

In FIG. 6 another embodiment of the anti-collapse device is shown, wherein the base part is omitted and plug part 21 is formed integral with swivel part 2. In this embodiment the cross section of the plug part is conical or V-shaped.

FIG. 7 shows another embodiment of the anti-collapse device, wherein the base part is omitted and plug part 22 is formed as a rigid core inside a helical wound seal spring. The core 22 prevents the ring 23 from loosing its shape by over deformation.

FIGS. 8 and 8a show another embodiment of the anti-collapse device 10, wherein the plug part 24 is integral with both the spring body and the base part 11. In this case the base part 11 prevents the legs from folding inwardly too far.

FIG. 9 shows another embodiment of the anti-collapse device, wherein the spring, the base part and the plug part of the anti-collapse device are integral, the spring 19 is V-shaped in cross-section. The inwardly turned ends of the legs form the base part as well as the plug part. These parts limit the inward movement of the spring legs and consequently of the seal legs.

Although the invention has been described above with reference to preferred embodiments it has to be understood that several amendments can be made without leaving the scope of protection conferred by the enclosed claims. Combination of the several features disclosed for the different embodiments is within the range of a person skilled in the art.

We claim:

1. A sealing system for a rotatable fluid conduit coupling, the coupling comprising:

a ring-shaped inner part;

a ring-shaped outer part connected to the inner part with a clearance therebetween;

at least one sealing ring sealing the clearance, the sealing ring being located in an annular recess in at least one of the parts, the sealing ring being of resilient material and functioning under a pressure differential in the clearance in which a coupling interior pressure exceeds an exterior pressure, the sealing ring having a cross section comprising an annular deformation-limiting means comprising a spring disposed between the legs of the sealing ring, the spring comprising two spring legs urging the legs of the sealing ring away from one another, wherein the spring comprises a transverse section located adjacent free end parts of the spring legs, said transverse section being of lesser length than the distance between said spring legs at free end parts thereof, for bridging the distance between the end parts of the spring legs and for limiting compression of the spring legs toward one another upon a pressure differential in which the exterior pressure exceeds the interior pressure.

2. A sealing system as claimed in claim 1, wherein said spring has a web that extends between said legs and said transverse section is disposed on an end portion of said web in the path of said free end parts of said spring legs when said free end parts of said spring legs approach each other upon a pressure differential in which the exterior pressure exceeds the interior pressure.

3. A sealing system as claimed in claim 1, wherein said transverse section is disposed on both said free end parts of said spring legs.

4. A sealing system as claimed in claim 1, wherein said transverse section is perpendicular to a common axis of said inner and outer parts and of said sealing ring.

* * * * *